United States Patent [19]

Wang et al.

[11] Patent Number: 5,299,123
[45] Date of Patent: Mar. 29, 1994

[54] METHOD FOR ALLOWING RETRIEVAL OF DOCUMENTS WITH USER DEFINED SEARCH DESCRIPTORS

[75] Inventors: Diana S.-F. Wang, Trophy Club, Tex.; Charles M. N. Cree, Boeblingen, Fed. Rep. of Germany

[73] Assignee: International Business Machines Corporation, Armonk, N.Y.

[21] Appl. No.: 847,869

[22] Filed: Mar. 9, 1992

Related U.S. Application Data

[63] Continuation of Ser. No. 454,100, Dec. 20, 1989, abandoned.

[51] Int. Cl.$^5$ ............................................. G06F 15/40
[52] U.S. Cl. .................................. 364/419.1; 395/600
[58] Field of Search ............................. 364/419, 419.1; 395/600, 650

Primary Examiner—Gail O. Hayes
Attorney, Agent, or Firm—David A. Mims, Jr.

[57] ABSTRACT

This invention relates to a method of adding a number of search terms that express syntax and semantics for an enterprise of related users to a document in a Document Interchange Architecture (DIA) Library. The enterprise related search terms are combined with specially architected DIA search terms and are made available to mechanisms used to search for documents in a shared library. The enterprise related search terms are first identified and placed in enterprise sub-profiles accessible to index build mechanisms. Associated search terms tables are created and made available to the index build mechanisms. Search indexes are created containing the enterprise unique search terms along with the DIA architected terms. The search indexes are then stored with the related documents in the Document Interchange Architecture Library and made available to search mechanisms for locating the document in the shared library.

7 Claims, 5 Drawing Sheets

THE FILE COMMAND

| COMMAND | OPERANDS |
|---|---|
| FILE | IDENTIFIED-DATA |
| | [,REFERENCED-DATA](TO CONTEXT) |
| | [,REFERENCED-DATA](TO DOCUMENT) |
| | [,REFERENCED-DATA](COPY AUTHORIZATION) |
| | [,AUTHORIZE] |
| | [,UNIQUE-NAME] |
| | [,ON-BEHALF-USER] |
| | [,SI-DATA-CREATE] |
| | [,CONTEXTUAL-DATA-CREATE] |
| | [,CONTEXTUAL-DATA-NAME] |
| | [,PROCESS-NAME] |
| | [,PROCESS-PARAMETERS] |
| | [,DOCUMENT-STATE] |
| | [,TARGET-SERVICE] |
| | [,FILE-OPTION] |
| | [,ESSP-OPTION] |

*FIG. 4*

THE MODIFY COMMAND

```
COMMAND         OPERANDS
MODIFY          INDENTIFIED-DATA,

[,MODIFY-DATA]
                [,AUTHORIZE]
                [,UNIQUE-NAME]
                [,REFERENCED-DATA]

[,ON-BEHALF-USER]
                [,SOURCE-SERVICE]
                [,ESSP-OPTION]
```

*FIG. 5*

THE FILE-DELIVERY COMMAND

```
COMMAND         OPERANDS
FILE-DELIVERY   IDENTIFIED-DATA,
                [,KEEP-OPTION]
                [,MODIFY-DATA]

[,UNIQUE-NAME]

[,ON-BEHALF-USER]
                [,AUTHORIZE]
                [,REFERENCED-DATA] (COPY AUTHORIZATION)

[,REFERENCED-DATA] (TO CONTEXT)

[,REFERENCED-DATA] (TO DOCUMENT)
                [,DOCUMENT-STATE]
                [,SI-DATA-CREATE]
                [,CONTEXTUAL-DATA-CREATE]
                [,CONTEXTUAL-DATA-NAME]
                [,PROCESS-NAME]
                [,PROCESS-PARAMETERS]

[,DEFER-OPTION]
                [,TARGET-SERVICE]

[,ESSP-OPTION]
```

*FIG. 6*

WHERE:
LL = 2 BYTES SPECIFYING THE LENGTH OF THE SEARCH TERM INCLUDING LL,
ID = 2 BYTES IDENTIFYING THE SEARCH TERM,
F = 1 BYTE SPECIFYING THE FORMAT OF SEARCH TERM CONTENT.

METHOD FOR ALLOWING RETRIEVAL OF DOCUMENTS WITH USER DEFINED SEARCH DESCRIPTORS

This application is a continuation of Ser. No. 454,100 filed on Dec. 20, 1989, now abandoned. CROSS-REFERENCE TO RELATED APPLICATIONS This application is related in subject matter to the following application filed concurrently herewith and assigned to a common assignee:

Application Ser. No. 453,542, now abandoned filed by Cree, et. al. entitled "Table Manipulations for Enterprise Specific Search Terms".

The foregoing co-pending application is incorporated herein by reference.

FIELD OF THE INVENTION

The present invention relates to expanding user access to a library of shared documents, and more particularly, permitting access of shared documents with user defined search terms.

BACKGROUND OF THE INVENTION

Electronic office systems are increasingly providing for electronic document processing over a network of connected and differently located office systems. These networks of connected office systems consist of interconnected pieces of equipment and programs used for moving information between points where it may be generated, processed, stored and used. Documents stored within these electronic office systems must frequently be shared by many users or a collection of related users representing an enterprise. An enterprise as used in this invention comprises any economic organization. An enterprise may be a conglomerate, a company, a division within a company, a set of departments within a company, or a single department within a company. Shared documents are frequently stored in document libraries where they are accessible by members of an enterprise or other users. The ability to file a document in a library allows the filed document to be retrieved by issuing a SEARCH command. One prior art method for handling the exchange of documents in the library to an enterprise or user is the Document Interchange Architecture (DIA).

DIA is a program-to-program communication architecture which defines the protocols and data structures that enable programs to interchange information such as documents and messages in a consistent and predictable manner. DIA is independent of the type of information that is stored in a library and provides a defined set of parameters that describes the contents of information being transmitted, such as the name under which the information is filed, the authors, the subject of the information, the date the information was filed, keywords, etc. These descriptors enable a document to be searched in the library by an enterprise or end user.

However, the current implementation of DIA does not allow an enterprise or end user to add unique descriptors beyond a defined set of DIA descriptors. As a result, an enterprise such as a bank, is limited to searching for documents stored in the library by author, subject matter, date file, etc. The enterprise cannot use search terms that express syntax and semantics defined by the enterprise. For example, a banking enterprise cannot issue searches using search terms with the semantics of "Bank Account ID" or Loan Identifier". Likewise, a manufacturing enterprise with access to documents stored in the library, cannot issue searches using search terms with the semantics of "parts" or "inventory".

Consequently, what is needed is a technique to allow an enterprise to define the syntax and semantics of search terms that are specific to that enterprise.

SUMMARY OF THE INVENTION

This invention relates to a method of expanding user access to a Document Interchange Architecture (DIA) Library of shared documents. The method permits an enterprise of related users to add search terms specific to their application to system generated search terms. Search terms unique to an enterprise's specific application are identified and placed in sub-profiles accessible to the same index build mechanisms used for building system generated search indexes. Associated search term tables for the enterprise specific search terms are created and made available to the index building mechanisms. The sub-profiles and search term tables are uniquely identified as belonging to a particular enterprise. Search indicies are created containing the enterprise's unique search terms along with system generated search terms. The search term indicies are stored with the document and are available for retrieving the document from a library of shared documents.

BRIEF DESCRIPTION OF THE DRAWINGS

FIG. 4 is a document interchange FILE command with available operands.

FIG. 5 is a document interchange MODIFY command with its available operands.

FIG. 6 is a document interchange FILE-DELIVERY command with its available operands.

DETAILED DESCRIPTION

Figure 1:
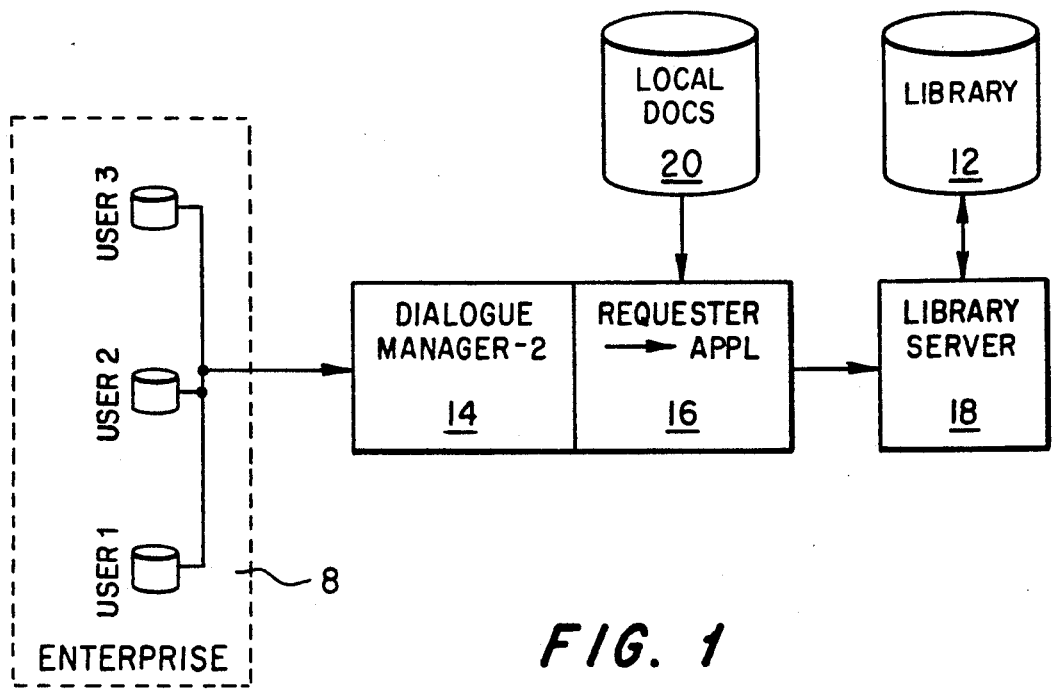
FIG. 1 is a block diagram of a document interchange system in accordance with the principles of the present invention.

FIG. 1 shows a Document Interchange System for controlling the creation, retrieval, editing and distribution of shared documents within an electronic office system. A plurality of users, grouped together to form an enterprise 8, interact with a dialogue manager application 14 to file documents in a system library 12. An enterprise 8 may be any economic organization. An enterprise 8 may be a conglomerate, a company, a division within a company, a set of departments within a company, or a single department within a company. The dialogue manager application 14 handles, among other things, the gathering of addressing information for access control, contextual-search characteristics, and requester/principle identifiers. The requester application 16 accepts the above-identified information from the dialogue manager application 14, builds an add or a file request, and transmits the request to the library server 18. The requester application 16 also passes local documents 20 stored in the enterprise's local storage to the library 12.

The library server 18 files documents into the library 12 upon a request from a member of the enterprise 8. The DIA system shown in FIG. 1 represents an encoding scheme designed to convey any document. Documents can be transmitted irrespective of content from one type of office system to another. In addition, the intent of the person creating or transmitting the document can be conveyed as to the method of processing required. The library server 18 handles the creation of the parameters or descriptors for documents that are to be stored in the library 12. The DIA system requires that these parameters or descriptors be placed in document objects. The descriptors contained in the document objects include the name under which the information is filed, the authors, the subject of the information, and the date the information was filed in the document history. These descriptors enable a document to be searched after it is filed in the library 12. The descriptors are placed in a document profile and are filed with the document. It is the document profile that enables a document to be searched once it is stored in the library 12. For purposes of illustration and not limitation, a member of the enterprise 8 can ask the DIA system to search for all documents regarding a particular subject and by a certain author which was filed in the library 12 between any two dates. After completing the search, the DIA system presents the enterprise 8 with a list of documents meeting the search criteria.

The library 12 also provides services for filing documents in and retrieving or deleting documents from the library. Enterprise users 8 may update work in progress documents in the library 12 or specify a security level to associate with a document that is being filed. An enterprise user 8 who files a document in the library 12 may authorize other users to retrieve the document from the library. The library server 18 assigns each new document filed in the library 12 a unique name called a library-assigned document name (LADN). This LADN is returned to the enterprise user 8 making the file request and can be used to uniquely identify the document at some later time.

Figure 2:
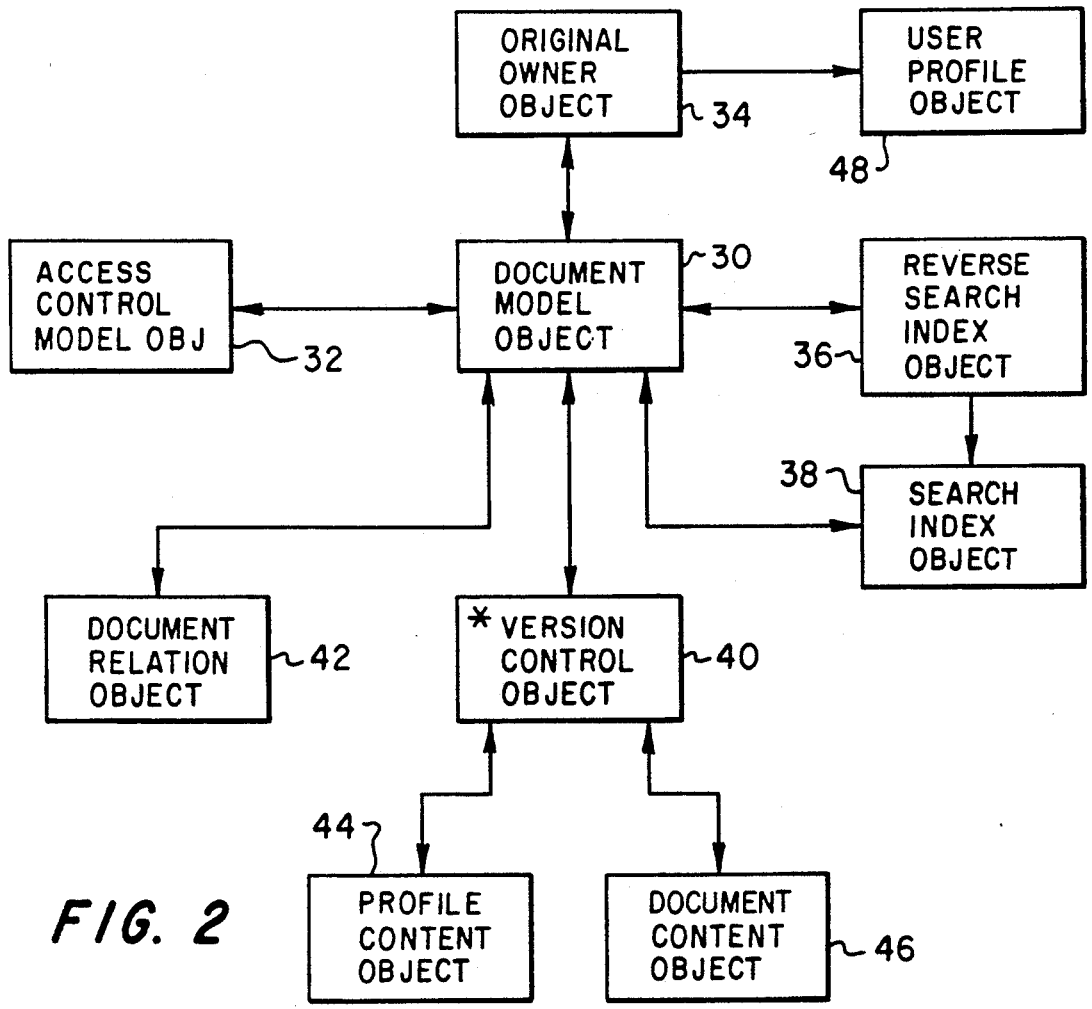
FIG. 2 is a document model showing the various objects associated with information stored in the system of FIG. 1.

Referring to FIG. 2, each document stored in the library 12 includes the objects shown therein. All of the objects shown in FIG. 2 are created in response to the processing of a FILE command. A Document Model Object 30 (DMO) contains information concerning ownership and attributes of a specific document. This object controls access to the document during its life in the library. The Original Owner Object 34 (OOO) contains or points to information used by an owner of a document to control access to the document as filed. The Document Content Object 46 provides for the storage of the document contents and for saving information relating to the actual size of the filed document. The Document Relation Object 42 (DRO) describes the logical relationships between the document and other documents. If the document is a folder containing related documents, each of the related documents contained therein will have a pointer or LADN entry in this object. The Access Control Model Object 32 (ACMO) is created when a document owner authorizes other users to access the document. Structures for all of the objects except the Profile Content Object 44 are a pair of the DISOSS office system and will not be described herein. Every document stored in the document interchange system shown in FIG. 1, has a Profile Content Object 44 (PCO) associated therewith. When an enterprise user 8 issues a SEARCH command to search the library 12 for documents meeting a specific search criteria, the library server 18 will access each document's Profile Content Object 44 to satisfy the search.

Figure 3:
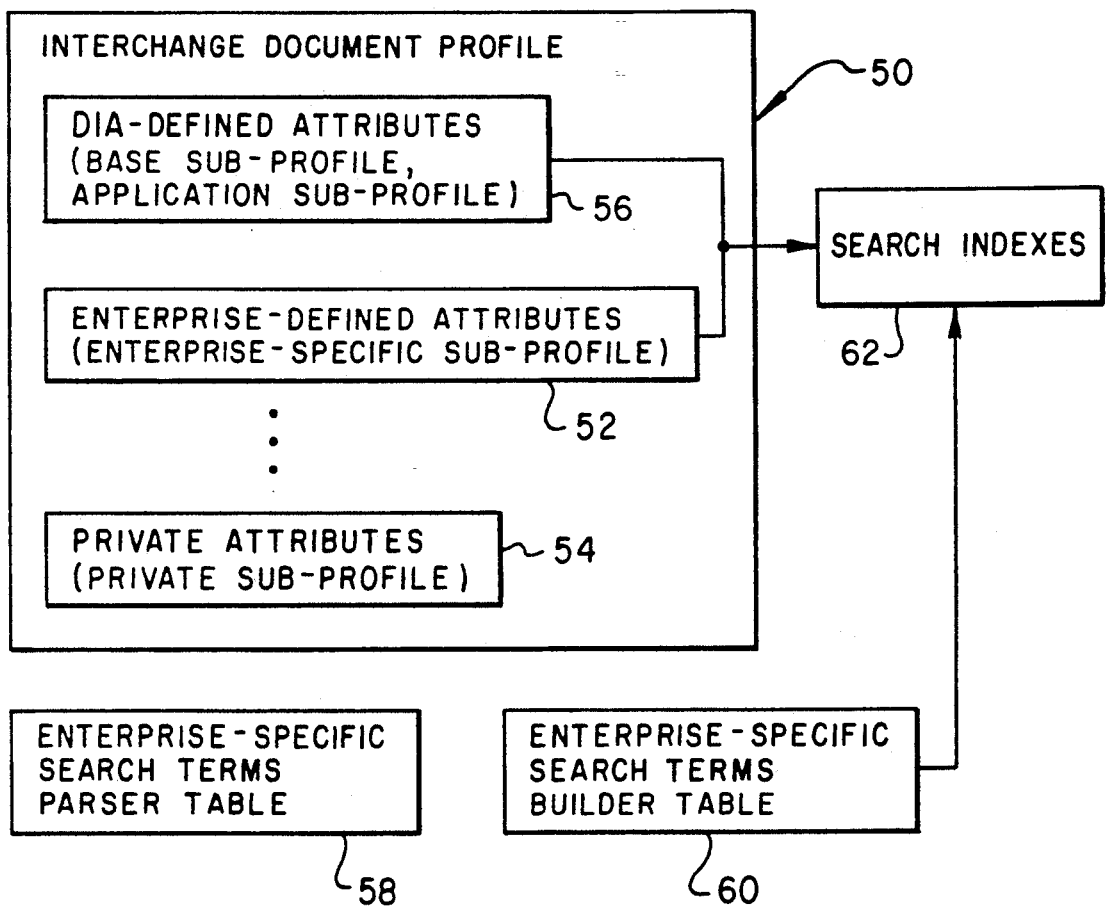
FIG. 3 is a block diagram of the Interchange Document Profile stored in the Profile Content Object.

Turning to FIG. 3, a general scheme is disclosed for enterprise specific search term generation. The term Enterprise Specific Search Term (ESST) is employed to distinguish enterprise search terms from DIA architected search terms. The Interchange Document Profile (IDP) 50 shown in FIG. 3, exists for each document stored in the library 12, shown in FIG. 1. The IDP 50 for each document is physically stored in the Profile Content Object (PCO) 44. As currently implemented, DIA systems gather document attribute information from DIA-defined attributes shown in block 56. The DIA system can therefore generate search indexes 62 which are stored with the document when it is placed in the library. In order to add Enterprise Specific Search Terms (ESST) to the search indexes 62, this invention adds the enterprise-defined attributes shown in blocks 52 and 54. In addition, the invention requires the generation and loading of two tables to generate the Enterprise Specific Search Terms. The ESST parser table 58 and the ESST builder table 60 must be present before the search indexes 62 can be built. These tables represent the formatting information required to parse or build DIA search data streams. The tables identify DIA structures by name, and illustrate hierarchical relationships between the DIA structures. The ordering of the structure entries within the tables represents, unless otherwise specified, the order in which the structures appear in a DIA data stream.

The library server will check for the presence of the Enterprise Specific Search Terms tables before building the search indexes for ESST. If the tables have not been properly installed, no search indexes will be built. If the tables have been properly installed, the library server will build the search indexes for the ESST based on the validation rules, synonym provision, and standardization defined in the tables. This invention permits an enterprise user to building validation tables based on unique user requirements. Therefore, an enterprise user is given the capability to change the validation rules per enterprise requirements, while maintaining an interchangeable, DIA-defined syntax and format.

Each enterprise supported by a DIA library may define its own unique ESST. If a library supports more than one enterprise, a document may have ESST for different enterprises. Turning again to FIG. 3, the enterprise defined attributes 52 exist in enterprise-specific sub-profiles. The enterprise-specific sub-profiles 52, 54 are present only when a supported enterprise has a set of ESST associated with a document. If more than one enterprise has search terms associated with a document, there will be more than one enterprise-specific sub-profile defined. Therefore, one enterprise-specific sub-profile will exist for each enterprise.

The enterprise-specific sub-profiles 52, 54 are created via a FILE, MODIFY, COPY or FILE-DELIVERY command. The enterprise-specific sub-profiles 52, 54 are created only when the ESSP-OPTION operand is set to "create" in one of these commands. FIGS. 4-6 show the DIA FILE, MODIFY, and FILE-DELIVERY commands. Note the presence of the enterprise-specific sub-profile option („ESSP-option) in the operand field of each command. The COPY command, which is not shown, contains a similar option in its operand-field.

When the enterprise-specific sub-profile operand has the value "create" in one of the commands shown in FIGS. 4-6, the library server checks whether the ESST tables, 58, 60 in FIG. 3, for the specific enterprise have been installed in the library. If the tables are not found, a warning message is generated. In any case, search indexes are built only if the tables are installed. The enterprise-specific sub-profile is then created and stored in the library with the document.

Figure 7:
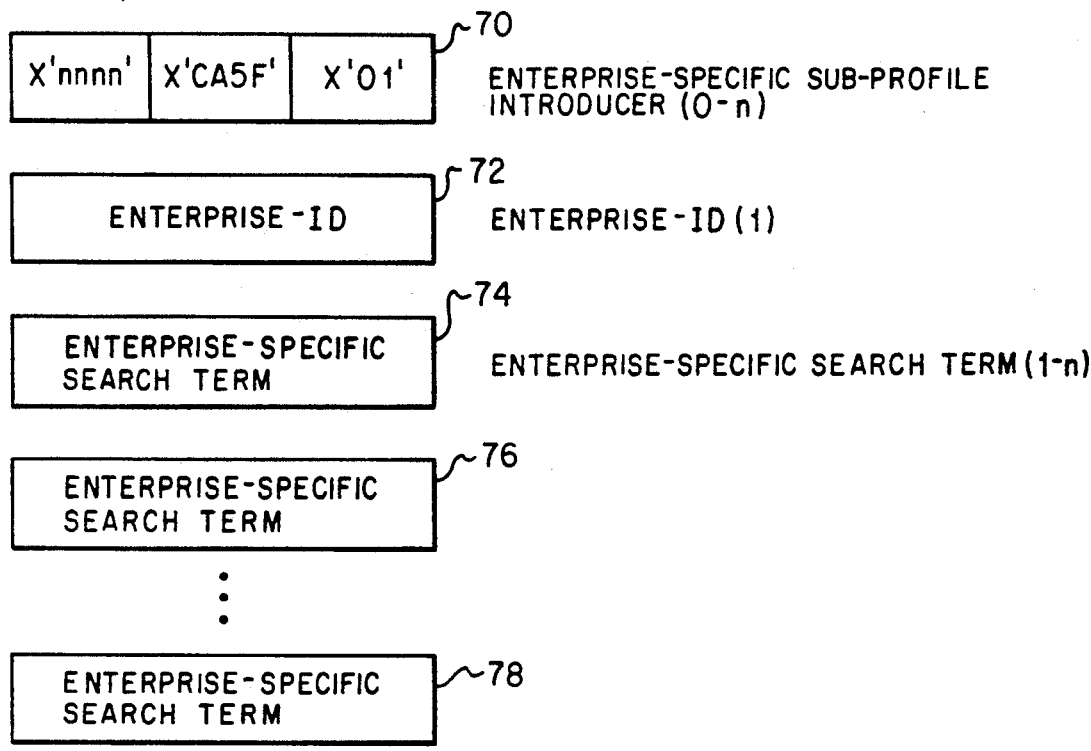
FIG. 7 illustrates a sub-profile used by this invention.

The enterprise-specific sub-profile uses the DIA self-defining structured field notation. The sub-profile, as illustrated in FIG. 7, starts with a sub-profile introducer 70, followed by an enterprise-identification 72, and one or more enterprise specific search terms 74-78. The sub-profile introducer 70 identifies the sub-profile as enterprise related instead of DIA-defined. The invention provides for zero to N enterprise-specific sub-profile introducers.

The enterprise-ID 72 follows the sub-profile introducers 70. The enterprise-ID 72 is a required parameter in this embodiment and can only appear once. It is the first parameter in the enterprise-specific sub-profile. It is used to identify the enterprise which is associated with the enterprise-specific sub-profile. A user within an enterprise may modify the enterprise-ID 72 if the user has at least change authority to the document being file in the library.

Figure 8:
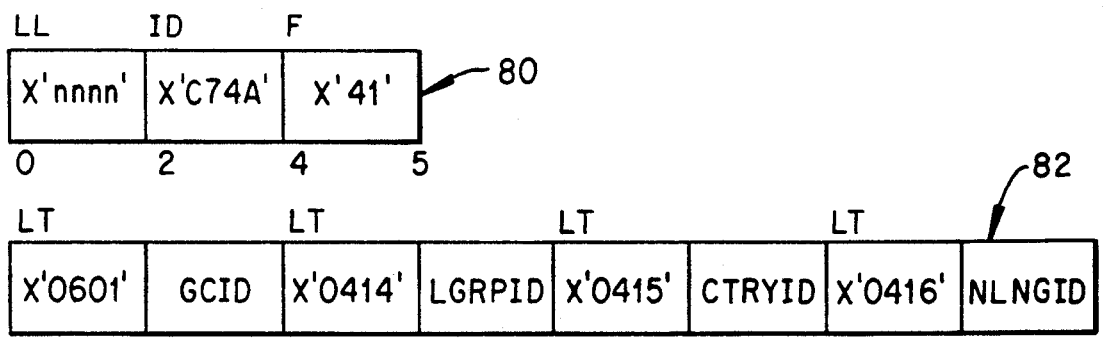
FIG. 8 shows the structure of enterprise specific-identification as used in this invention.

The structure for the enterprise-ID 72 is shown in FIG. 8. The structure conforms to DIA data stream structure and therefore breaks down into the following format. The first 5 bytes of the enterprise-ID, shown in FIG. 8, and designated 80, consist of a 2 byte length specifier, LL, a 2 byte identification field, ID, and a 1 byte field, F, specifying the format. Blocks 82 and 84 provide additional fields for defining an enterprise. The GCID field in block 82 is an optional field. It specifies the GCID of the enterprise name. If this field is not present, the profile GCID is the default. The Language Group Identification (LGRPID) also appears in block 82. It is a 2-byte field which identifies the national language group to which the language being identified belongs. The Country Identification (CTRYID) and National Language Identification (NLNGID) also appear in block 82. The Country Identification (CTRYID) is 2-byte field which contains the code assigned to the country with which the national language information is being related. The National Language Identification (NLNGID) is a 2-byte field which contains a code assigned to the national language being identified. If the national language support fields LGRPID, CTRYID, and NLNGID are not present, the profile National Language support is the default.

Block 84 in FIG. 8 contains the final two fields for the enterprise-ID. Net Identification (NETID) is a 1 to 8-byte character field. It specifies the office system network. If there is no NETID specified, the local network is the default. The last field is the NAME field. It is 1 to 44 bytes in length. It specifies the name of the enterprises and is a required field. The NAME field can be repeated to fully identify the enterprise. The order of the repeated NAME fields is important.

Figure 9:
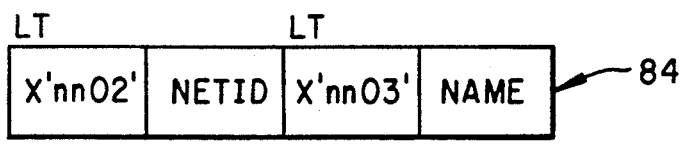
FIG. 9 shows the structure for the enterprise specific search terms as used in this invention.

The enterprise-specific search terms, shown as blocks 74-78 in FIG. 7, have the structure shown in FIG. 9. The ESST, 74-78, are required parameters and can appear multiple times. These terms specify the searchable attributes specific to the enterprise which was defined in the enterprise-ID parameter 72. The ESST can be modified by the enterprise user who has the appropriate access authority to the document. Although the enterprise-specific search terms 74-78 are defined by the enterprise, the structure of the ESST parameter must conform to the DIA data stream structure. As shown in FIG. 9, the structure of the ESST parameter is composed of LL, ID, F, and content fields. The LL field is 2-bytes and defines the length of the search term. The ID field is also 2 bytes and identifies the search term. The ID field can be any hex value except X'CA5F' (the ID for the enterprise-specific sub-profile) or X'C74A' (the ID for the enterpriseID). The F field is 1 byte and specifies the format of the search term content. The F field must conform to the DIA standard for the 0th bit and the 3rd bit. Finally, the content field is of variable length and contains the search terms.

In summary, this invention discloses a method which allows an enterprise user to define the syntax and semantics of search terms that are specific to that enterprise to create, search, or retrieve information stored in a shared library. The Enterprise-Specific Search Terms (ESST) are associated with a document to be stored in the shared library through the Interchange Document Profile (IDP). While the ESST could also be associated with a document through a Library Model Object (LMO), the IDP is preferred because it contains DIA attributes that are very similar to enterprise specific search terms. An enterprise specific sub-profile is the preferred method of implementing this invention. The sub-profiles contain the enterprise defined search terms and are identified as belonging to a particular enterprise. Associated search term tables are required for each enterprise. The enterprise specific sub-profiles are accessed when there is a value of "create essential search profile" in the FILE, MODIFY, COPY or FILE-DELIVERY commands. Index build mechanisms, normally used for DIA architected search terms, access the enterprise unique sub-profiles to build combined indicies of user and DIA architected search terms. These indicies are stored with each document and are available to document access mechanisms for later retrieval of the documents.

While the invention has been particularly shown and described with reference to preferred embodiments thereof, it will be understood by those skilled in the art that various changes in form and detail may be made therein without departing from the spirit and scope of the invention.

What I claim is:

1. A method of adding an enterprise specific search term for a plurality of documents in a shared library within a document interchange management system, said method comprising the steps of:

associating a least one of said plurality of documents with a sub-profile in an interchange document profile for said enterprise;

creating an enterprise specific search term and placing it in said sub-profile; and building a search index containing said enterprise specific search term and storing the search index with the document in said library.

2. The method as recited in claim 1 wherein said associating step includes the steps of:

creating a user command within said document interchange management system for building said sub-profile; and monitoring said sub-profile for missing enterprise input and storing said sub-profile in said shared library.

3. A method of adding enterprise specific search terms to a document in a document library comprising the steps of:
- identifying enterprise related search terms and placing them in a sub-profile;
- creating enterprise search term tables uniquely identified as belonging to said enterprise;
- building a search index of said enterprise search terms and DIA architected search terms; and
- storing said index in said document library for accessing said document.

4. A method of adding specific search terms for an enterprise to a document, said method comprising the steps of:
- associating at least one of said plurality of documents with a sub-profile in an interchange document profile for said enterprise;
- creating specific SEARCH term tables for said enterprise and building a search index for said document; and
- storing said search index along with the document in said shared library.

5. A system for dynamically adding a search term to an index in a document interchange architecture structure within a data processing means, said index having a fixed set and a variable set of index entries for retrieving a plurality of documents from a shared library:
- means for specifying said fixed set of index entries to a server means within said data processing means for said index;
- means for identifying said search term as a member of said variable set of index entries to said server means within said data processing means for said index; and
- means responsive to said specifying and identifying means for generating by said server means said index having said fixed set and said variable set of index entries when a parser table is present containing said search term in said document interchange architecture structure.

6. A system for dynamically adding a search term to an index in a document interchange architecture structure within a data processing means as recited in claim 5, wherein said means for identifying said search term as said member of said variable set of entries further includes means for a user to specify said member.

7. A system for dynamically adding a search term to an index in a document interchange architecture structure within a data processing means as recited in claim 6 wherein said parser table is provided in said document interchange architecture structure.

* * * * *